(12) United States Patent
Juvonen

(10) Patent No.: US 11,534,997 B2
(45) Date of Patent: Dec. 27, 2022

(54) ROLL PRESS ARRANGEMENT, PRESS ROLL APPARATUS AND A METHOD FOR DEWATERING FIBROUS GRANULAR FEEDSTOCK

(71) Applicant: SAALASTI FINLAND OY, Espoo (FI)

(72) Inventor: Arttu Juvonen, Espoo (FI)

(73) Assignee: SAALASTI FINLAND OY, Espoo (FI)

( * ) Notice: Subject to any disclaimer, the term of this patent is extended or adjusted under 35 U.S.C. 154(b) by 0 days.

(21) Appl. No.: 17/256,948

(22) PCT Filed: Jul. 1, 2019

(86) PCT No.: PCT/EP2019/067617
§ 371 (c)(1),
(2) Date: Dec. 29, 2020

(87) PCT Pub. No.: WO2020/007801
PCT Pub. Date: Jan. 9, 2020

(65) Prior Publication Data
US 2021/0370630 A1  Dec. 2, 2021

(30) Foreign Application Priority Data

Jul. 2, 2018 (EP) .................................... 18181150

(51) Int. Cl.
*B30B 9/20* (2006.01)
(52) U.S. Cl.
CPC .................................... *B30B 9/207* (2013.01)
(58) Field of Classification Search
CPC ........... B30B 9/207; B30B 9/09; B30B 11/20; B30B 11/202; B30B 11/207; B30B 3/00; B30B 3/005; B30B 9/205; B02C 15/08; B02C 15/10; B02C 15/16; B02C 4/283

USPC ...................................... 100/37; 99/457, 461
See application file for complete search history.

(56) References Cited

U.S. PATENT DOCUMENTS

| 2,196,650 A * | 4/1940 | Allen ...................... B30B 9/207 |
|  |  | 100/174 |
| 2,229,142 A * | 1/1941 | Stacom .................. B30B 9/207 |
|  |  | 100/157 |
| 2,904,829 A | 9/1959 | Frederich |

FOREIGN PATENT DOCUMENTS

| DE | 20 2015 104474 U1 | 11/2015 |
| EP | 0000662 A1 | 2/1979 |
| EP | 0144596 A2 | 6/1985 |
| WO | 2016/170227 A1 | 10/2016 |

OTHER PUBLICATIONS

International search report and written opinion dated Oct. 22, 2019 for International Application No. PCT/EP2019/067617.

\* cited by examiner

*Primary Examiner* — Adam J Eiseman
*Assistant Examiner* — Fred C Hammers
(74) *Attorney, Agent, or Firm* — Plumsea Law Group, LLC

(57) ABSTRACT

The disclosure relates a roll press arrangement, in which a rotatable side plate is supported against axial ends of press rolls to delimit a nip between press rolls and to prevent feedstock from escaping therefrom. Moreover, a clearance is arranged between the side plate and the axial ends of the press rolls so as to provide a drainage route for liquid dewatered from the fibrous granular feedstock. A press roll apparatus and a method for dewatering fibrous granular feedstock are also disclosed.

13 Claims, 5 Drawing Sheets

ROLL PRESS ARRANGEMENT, PRESS ROLL APPARATUS AND A METHOD FOR DEWATERING FIBROUS GRANULAR FEEDSTOCK

FIELD OF THE DISCLOSURE

The present disclosure relates to dewatering fibrous granular feedstock, and more particularly to a roll press arrangement for such purpose. The present disclosure further concerns a press roll apparatus equipped with such a roll press arrangement, and a method for dewatering fibrous granular feedstock using such an press roll apparatus.

BACKGROUND OF THE DISCLOSURE

Fibrous granular feedstock, such as woodchip, saw dust, bark, commuted cane, straw, and the kind, is commonly used as solid fuel for energy production either directly, or in pelletized form. In such an application, the dryness of the feedstock significantly affects the effective energy content of the feedstock, as any moisture will be evaporated during combustion. Consequently, the net caloric value of feedstock increases as moisture is dewatered therefrom. Moreover, feedstock having an excessively high moisture content will not be able to sustain combustion by itself.

Therefore, fibrous granular feedstock, for which a low moisture content is required, is dried before being subjected for further processing. Typically, this has been done by evaporating the moisture at elevated temperatures, which is very energy consuming, thus reducing the overall efficiency of the energy production process. In certain applications, where the liquid contents of the feedstock is valuable, dewatering may have been done by mechanical compression. However, this has been limited to relatively soft feedstock, from which dewatering is achieved with a relatively low compression pressure. Even in such cases, the efficiency of dewatering has not been optimal, partly due to issues relating to increasing the compression pressure. As mentioned, fibrous granular feedstock may alternatively be dewatered by subjecting said feedstock to compression. Particularly, attempts to dewater fibrous granular feedstock into a nip between two rollers have been made. However, the extremely high compressive forces required to sufficiently dewater the feedstock for energy production, or to achieve efficient dewatering from a broad range of fibrous granular feedstock, result in a situation where the feedstock strives to escape from between the rollers. It is believed that is at least partly due to the water contents of the feedstock being released in an explosive manner when the fibrous structure of the feedstock collapses under high compression. Nevertheless, this has hindered attempts to dewater granular fibrous feedstock by compression at an economically feasible scale.

A previous approach to addressing this issue has been to provide the rollers with flanges covering the nip. However, this has resulted in further complications. Namely, the feedstock clings tightly to the roller and the flanges thereof, which in turn, blocks any possible apertures provided on the flange for draining the dewatered liquid, resulting in unsatisfactory dewatering performance.

An alternative previous approach to address feedstock escaping form the nip between the rollers has been to feed the feedstock to the nip between a web screen. However, such a web screen is prone to breakage if any foreign objects, such as stones etc., are accidentally introduced into the nip.

Document EP 0 000 662 A1 discloses a rolling mill for metal powder compaction equipped with edge restraint devices. Document FR 1 447 899 discloses a bark press comprising a central roller, multiple dewatering rolls pressed against the central roll, and scrapers provided for scraping the bark off the dewatering roll and guiding it to the next dewatering roll. Document DEP 0 144 596 A2 discloses an apparatus for removing liquid from fibrous materials having two hollow compression rollers with perforated circumferential walls pressed against each other. Document WO 2016/170227 discloses a drum-type press for removing liquid from bark, having a screen drum and two press rolls positioned within the screen drum.

BRIEF DESCRIPTION OF THE DISCLOSURE

An object of the present disclosure is to provide a roll press arrangement for dewatering fibrous granular feedstock so as to overcome the disadvantages discussed above.

In the context of this disclosure, the term dewatering also encompasses extracting liquid contents other than water from fibrous granular feedstock, in accordance to established terminology commonly used in the field. Particularly, the extracted liquid contents, i.e. effluent, may entrain small amounts of fine particles having a particle size substantially smaller than that of the fibrous granular feedstock.

The object of the disclosure is achieved by a roll press arrangement, a press roll apparatus and a method which are characterized by what is stated in the independent claims. The preferred embodiments of the disclosure are disclosed in the dependent claims.

The disclosure is based on the idea of providing a rotatable side plate supported against axial ends of press rolls to delimit a nip between press rolls and to prevent feedstock from escaping therefrom. Moreover, a clearance is arranged between the side plate and the axial ends of the press rolls so as to provide a drainage route for liquid dewatered from the fibrous granular feedstock.

The solution according to the present disclosure provides a robust and reliable arrangement, apparatus and method for dewatering of fibrous granular feedstock while achieving excellent dewatering performance with minimal energy consumption. That is, drier feed stock is achieved, while more of the liquid contents is recovered and less energy is used for dewatering.

BRIEF DESCRIPTION OF THE DRAWINGS

In the following, the disclosure will be described in greater detail by means of preferred embodiments with reference to the accompanying drawings, in which FIG. 1-FIG. 3 schematically illustrate different views of a press roll arrangement according to an embodiment of the present disclosure.

DETAILED DESCRIPTION OF THE DISCLOSURE

Figure 1:
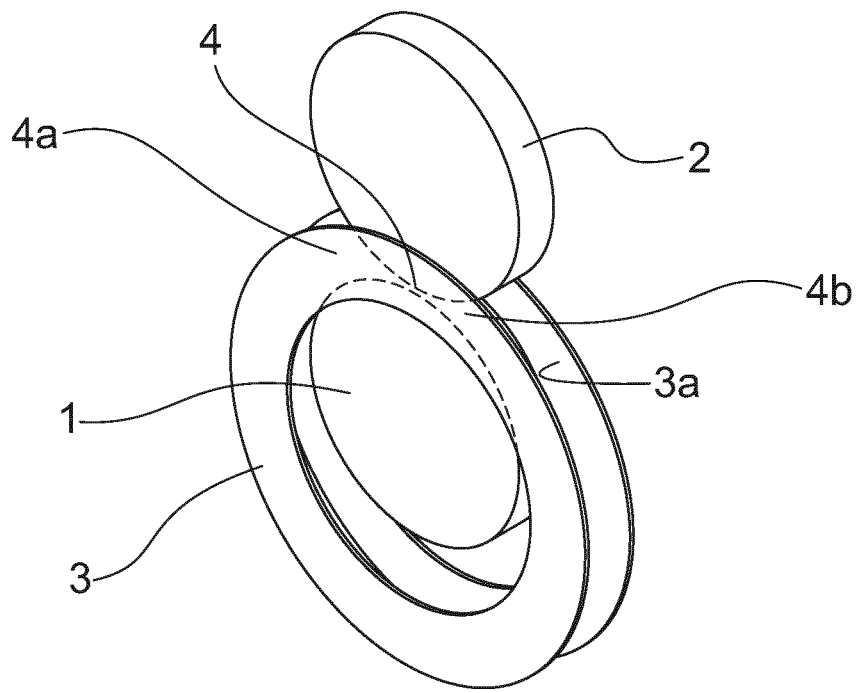

According to a first aspect of the present disclosure, a roll press arrangement for dewatering fibrous granular feedstock in a roll press apparatus is provided.

The arrangement comprises a first cylindrical press roll 1 having a first central axis, said first press roll being arranged to be rotatable about said first central axis, and a second cylindrical press roll 2 having a second central axis parallel with the first central axis, said second press roll being arranged to be rotatable about said second central axis. It should be noted, that the surface of outer circumference of the first and second press rolls 1,2 does not need not be smooth or even. For example, either or both of the first and second press rolls 1,2 may comprise a profile such as axially extending profiled grooves spaced along the outer circumference of the press rolls. The first press roll 1 and the second press roll 2 are further arranged such that a nip 4 is formed between the first press roll 1 and the second press roll 2 so as to apply a compression force on fibrous granular feedstock for dewatering thereof, when in use.

The required compression force depends on the type of the fibrous granular feedstock being dewatered. In general, softer material, such as bark, require a lower compression force than harder material, such as wood chips. It has been found that each material has a compression force threshold at which the fibrous structure of the fibrous material collapses, thus freeing liquid contents to be dewatered from the fibrous granular feedstock, substantially increasing dryness thereof and increasing the amount of liquid contents recovered.

Preferably, but not necessarily, the nip 4 is formed directly between the first press roll 1 and the second press roll 2, i.e. the fibrous granular feedstock within the nip is in direct contact with both of the press rolls 1, 2, when in use.

For most fibrous granular feedstock, this threshold is achieved by applying a linear load of preferably, 0.5-14 kN/mm, more preferably 2-10 kN/mm, most preferably 2.5-9 kN/mm, in the nip 4.

A feed region is defined between the first press roll 1 and the second press roll 2 at an inlet side 4a of the nip 4. Moreover, the first press roll 1 and the second press roll 2 are arranged so as to be rotatable towards the nip 4 on the inlet side 4a thereof for introducing fibrous granular feedstock from feed region into the nip 4.

The roll press arrangement further comprises a side plate 3 having a third central axis and arranged to be rotatable about said third central axis towards the nip 4 on the inlet side 4a thereof. Moreover, the side plate 3 is arranged at an axial end of the first press roll 1 and the second press roll 2 such that a side surface 3a of the side plate 3 axially delimits at least the nip 4 and the feed region. Preferably, but not necessarily, the side plate 3 is of a circular shape. more preferably the side plate 3 is of an annular shape.

The side plate 3 is further supported against the axial end of the first press roll 1 and the second press roll 2 at least at a position corresponding to the nip 4 so as to prevent the fibrous granular feedstock from escaping the nip 4 in an axial direction, when in use. A clearance is arranged between the side surface 3a of the side plate 3 and the axial end of the first press roll 1 and the second press roll 2 at least at the feed region so as to provide a drainage route for liquid dewatered from the fibrous granular feedstock.

The width of the clearance between the side surface 3a of the side plate 3 depends on the particle size of the fibrous granular feedstock being dewatered. As a general principle, the clearance should be arranged such that the fibrous granular feedstock does not substantially escape through the clearance, while enabling the dewatered liquid contents to be drained therethrough.

Advantageously, the clearance between the side surface 3a of the side plate 3 is configured to be smaller than the particle size of the fibrous granular feedstock being dewatered. It should be noted that, depending on the fibrous granular feedstock being dewatered, it may comprise a fine fraction, i.e. a portion of the feedstock having a relatively small particle size as compared to that of the feedstock's main portion. Generally, this fine fraction carries a minimal amount of the feedstock liquid contents, and it is not thus typically necessary to arrange the clearance to prevent the fine fraction from escaping the nip at the expense of restricting drainage of the dewatered liquid contents.

In practise, a suitable clearance may be determined by monitoring the amount of solid particles flushed away from the nip along with the liquid contents drained through the clearance. That is, the clearance may be widened up until the amount of solid particles found among the recollected liquid contents becomes excessive.

For most fibrous granular feedstock, a suitable clearance between the side surface 3a of the side plate 3 is preferably, 0.1-4 mm, more preferably 0.2-2 mm, and most preferably 0.3-1 mm, when in use. Typically, the side plate 3 slightly yields axially during operation, resulting in slightly smaller clearances when not in use.

Preferably, the roll arrangement according to the present disclosure may be implemented with two side plates 3, one at each common axial end of the first press roll 1 and the second press roll. However, the present disclosure may alternatively be implemented with a single side plate 3, also.

Preferably, but not necessarily, the press roll arrangement may comprise a radial biasing arrangement 8 so as to bias the first press roll 1 and the second press roll 2 towards each other for exerting a pressure on fibrous granular feedstock within the nip 4, when in use. Using a radial biasing arrangement 8 instead of supporting the press rolls in a fixed structure enables the press rolls to diverge away from each other in should an oversized foreign object be accidentally introduced into the nip, thus preventing failure of the roll arrangement. Moreover, a radial biasing arrangement 8 enables adjustment of the compression force exerted on the fibrous granular feedstock within the nip, when in use. This would be particularly advantageous, when different types of granular feedstock, requiring different compression forces, are dewatered sequentially. For example, the radial biasing arrangement 8 may be implemented using one or more of a pneumatic or hydraulic cylinder or a spring coils. Naturally, other biasing means may be used for implementing the radial biasing arrangement 8.

In an embodiment according to the first aspect of the disclosure, the side plate 3 has a diameter larger than that of the press roll. In addition, the side plate 3 is arranged to radially exceed an outer circumference of the first press roll 1 so as to axially delimit a bed of fibrous granular feedstock in the feed region, when in use Such an arrangement ensures that fibrous granular feedstock introduced to the feed region as a bed having a given thickness does not overflow from the axial ends of the feed region.

In an embodiment according to the first aspect of the disclosure, the side plate 3 is arranged non-concentric with at least the first press roll 1, such that a rotational direction of the side plate 3 diverges tangentially away from the rotational direction of the first press roll 1 at an outlet side 4b of the nip, outwardly from the outer circumference of the first press roll 1.

This facilitates removal of the dewatered fibrous granular feedstock from the press roll arrangement by ensuring that any adhesion between the dewatered fibrous granular feedstock and the side plate, and correspondingly, the dewatered fibrous granular feedstock and the first press roll counteract each other. In other words, any adhesion between the side plate 3 and the feedstock, strives to pull the feedstock away from the first press roll, and any adhesion between the feedstock and the first press roll strive pull the feedstock away from the side plate.

Preferably, but not necessarily, the side plate is arranged similarly also with respect to the second press roll 2. That is, the side plate 3 is arranged non-concentric with the second press roll 2, such that the rotational direction of the side plate 3 diverges tangentially away from the rotational direction of the second press roll 2 at an outlet side of the nip 4b, outwardly from the outer circumference of the second press roll 2.

Preferably, but not necessarily, the central axis of the side plate 3 is arranged at a distance from that of the first press roll 1, in a direction away from the nip 4.

Preferably, but not necessarily, the central axis of the side plate 3 may be offset form a line running through the central axis of the first press roll 1 and the second press roll 2, suitably towards the inlet side 4a of the nip 4.

In an embodiment according to the first aspect of the disclosure, the side surface 3a of the side plate 3 is arranged to axially diverge away from the axial end of the first press roll 1 and the second press roll 2 in a rotational direction of the side plate away from the nip 4.

That is, the side plate is arranged in such a way that the distance between the side surface 3a thereof and the axial end of the first press roll and the second press roll smaller at position corresponding to the nip 4 than at other positions.

Such an arrangement may be achieved, for example, by supporting the side plate 3 such that the side surface 3a is at a distance from the axial end of the first press roll and the second press roll when not acted upon. The side plate 3 may then be pressed at least at a position corresponding to the nip 4 to deflect the side surface 3a towards the axial end of the press rolls 1, 2. For example, the side plate 3, may be have an annular, frusto-conical shape, such that the side surface 3 is inclined outwardly away from the axial end of the first and second press roll 1, 2 outwardly from the third central axis.

This ensures that that a relatively large drainage route may be achieved while still achieving sufficient support for the side plate 3 against the axial end of the first press roll 1 and the second press roll 2 to prevent feedstock from escaping the nip 4 even when very high compression forces are used. Furthermore, this contributes towards increasing dewatering capacity of the press roll arrangement.

In an embodiment according to the first aspect of the disclosure, an axial biasing arrangement 7 is provided configured to axially deflect the side surface 3a of the side plate 3 towards the axial end of the first press roll 1 and the second press roll 2 at least at a rotational position corresponding to the nip. For example, position-adjustable rollers may be provided on the side of the side plate 3 opposite to the side surface 3a, so as to push the side plate 3 towards the axial ends of the first press roll 1 and the second press roll 2.

Such a configuration enables adjustment of the force with which the side plates presses against the axial end of the rollers. For example, when processing feedstock of a smaller particle size, the side plate 3 may need to be pushed against the axial end of the rollers with a relatively greater force to prevent the feedstock from escaping the nip, as compared to dewatering feedstock of a relatively larger particle size. In general, it is desirable to use as little force as possible to press the side plate against the axial end of the press rolls, because this increases the area of the drainage route and reduces wear the side plate and the press rollers.

In an embodiment according to the first aspect of the disclosure, the first press roll 1 and the second press roll 2 are positioned adjacent to each other, such that the nip 4 is formed between the respective outer circumferences of the first press roll 1 and the second press roll 2. In other words, the press rolls are positioned side by side, preferably one above the other.

In such arrangements, applying a linear load in the nip 4 of preferably 0.5-6 kN/mm, more preferably 2-4 kN/mm, most preferably 2.5-3.5 kN/mm, have been found suitable for achieving an increased dewatering performance for most fibrous granular feedstock.

The above-mentioned ranges have been found particularly suitable for press rolls 1, 2 having a diameter in the magnitude of 1 meter. However, press rolls 1, 2 of a different diameter may naturally be also used. Preferably, if a substantially larger or smaller diameter is used, the linear load is scaled accordingly, for example by maintaining in a similar ratio between the diameter and linear load. In addition, if press rolls 1,2, having mutually different diameters are used, a suitable approximation may be provided by using an average diameter of the two press rolls 1,2.

In an alternative embodiment according to the first aspect of the present disclosure, the first press roll 1 is positioned within the second press roll 2, which has an annular cross-sectional profile. In such a case the nip 4 is formed between the outer circumference of the first press roll 1 and the inner circumference of the second press roll 2.

In such arrangements, applying a linear load in the nip 4 of preferably, 0.5-14 kN/mm, more preferably 6-10 kN/mm, most preferably 7-9 kN/mm, have been found suitable for achieving an increased dewatering performance for most fibrous granular feedstock.

The above-mentioned ranges have been found particularly suitable for press rolls 1, 2 having a diameter in the magnitude of 0.75 meter and 1 meter, respectively. However, press rolls 1, 2 of a different diameter may naturally be also used. Preferably, if a substantially larger or smaller diameter is used, while maintaining a similar ratio between the diameters of the first press roll 1 and the second press roll 2, the linear load is scaled accordingly, for example by maintaining in a similar ratio between the diameters and the linear load. In addition, if the ratio between the diameters of the press rolls 1,2, is changed, the linear load may be approximated in accordance with the difference of the average diameter of the two press rolls 1,2.

According to a second aspect of the present disclosure, a roll press apparatus is provided, comprising the press roll arrangement according to any of the embodiments, or variations thereof, of the first aspect of the present disclosure, as discussed above, Furthermore, a first rotation drive arrangement for rotating either, or both, of the first press roll 1 and the second press roll 2 is provided. For example, any suitable electric, hydraulic or pneumatic actuator may be used for rotating either or both of the press rolls. Moreover, any suitable transmission, such as those of belt, chain or gear-type may be used.

Moreover, a feed conveyor 5 is provided for feeding fibrous granular feedstock into the feed region. For example, any suitable conveyor, such as those of the belt or screw-type may be used.

Preferably, but not necessarily, a discharge conveyor, such as one of the types discussed above in connection with the feed conveyor 5, may be provided for discharging fibrous granular feedstock from the outlet side 4b of the nip 4

Preferably, but not necessarily, also the side plate 3 may be arranged rotationally driven. This may done either using a separate actuator, or alternatively, coupling the side plate with the first rotation drive arrangement using suitable transmission, as discussed above.

Suitably, the roll press apparatus comprises a frame structure 6, configured to support elements of the press roll arrangement according to any of the embodiments, or variations thereof, of the first aspect of the present disclosure. Suitably, such a frame structure 6 is further configured to additionally support remaining elements of a roll press apparatus according to any embodiment, or variations thereof, of the second aspect of the present disclosure.

According to a third aspect of the present disclosure, a method of dewatering fibrous granular feedstock is provided. Particularly, fibrous granular feedstock is dewatered by using the roll press apparatus according to any embodiment, or variations thereof, of the second aspect of the present disclosure, as discussed above.

When in use, fibrous granular feedstock is fed to the feed region defined between the first press roll 1 and the second press roll 2 at an inlet side 4a of the nip 4, while either, or both, of the first press roll 1 and the second press roll 2 are rotated, so as to introduce said fibrous granular feedstock from the feed region into the nip 4 between the first press roll 1 and the second press roll 2.

The side surface 3a of the side plate 3 is supported against the axial end of the first press roll 1 and the second press roll 2 at least at a position corresponding to the nip 4 so as to prevent the fibrous granular feedstock from escaping the nip 4 in an axial direction, A clearance is arranged between the side surface 3a of the side plate 3 and the axial end of the first press roll 1 and the second press roll 2 at least at the feed region so as to provide a drainage route for liquid dewatered from the fibrous granular feedstock.

Dewatered liquid is then received from the drainage route.

Preferably, but not necessarily, also the side plate 3 is rotated about the third central axis towards the nip 4 at the inlet side 4a thereof.

FIG. 1 depicts schematically a press roll arrangement according to an embodiment of the present disclosure, as seen from a perspective view. A first cylindrical press roll 1 and a second cylindrical press roll 2 are arranged to be rotatable about their respective central axis. Particularly, the press rolls 1, 2 are arranged one above the other, such that a nip 4 is formed between the outer circumferences of the press rolls 1, 2. Annular side plates 3, rotatable about their respective common central axis, are arranged on both axial ends of the first press roll 1 and the second press roll 2, such that the side surface 3a of the side plate 3 axially delimits the nip 4.

When in use, fibrous granular feedstock is fed at the inlet side 4a of the nip, from where the feedstock is introduced to be compressed into the nip 4 by the rotation of the press rolls 1, 2 towards the nip 4. Dewatered feedstock is then advanced to the outlet side 4b of the nip 4 to be collected. To prevent the feedstock from axially escaping the nip 4, the side plates 3 are supported against their respective axial ends of the press rolls 1,2, at least at position corresponding to the nip 4. Simultaneously, a clearance is arranged between the side surfaces 3a of the side plate 3 and the respective axial ends of the press rolls 1, 2, at least at the feed region, thus providing a drainage route for liquid dewatered from the fibrous granular feedstock.

Figure 2:
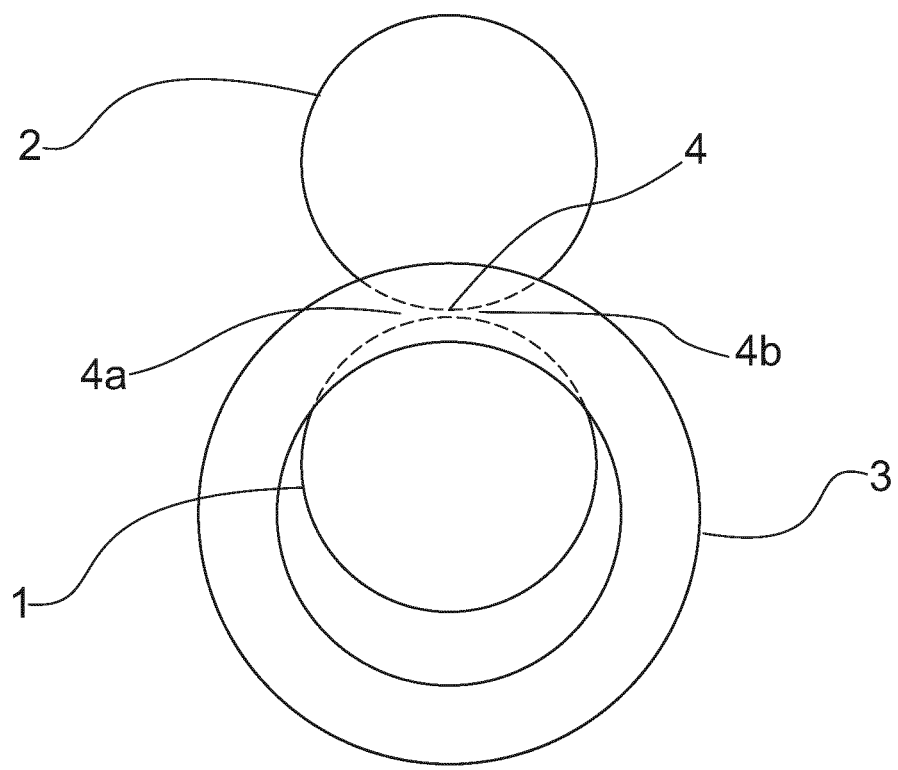

As seen more clearly from the side view of FIG. 2, the side plates 3 radially exceeds the outer circumference of the first press roll 1, such that the inlet side 4a of the nip 4 is also axially delimited by the side plates 3. This prevents a bed of fibrous granular feedstock being fed into the feed region from overflowing over the axial ends of the press rolls 1, 2.

Also, more clearly seen in FIG. 2, the side plates 3 have a diameter substantially larger than that of the first press roll 1. Moreover, the side plates 3 are arranged non-concentrically with the first and second press rolls 1, 2, such that the rotational direction of the side plates 3 diverges tangentially away from the rotational direction of the press rolls 1, 2 at the outlet side 4b of the nip, outwardly from the outer circumferences of the first and second press rolls 1,2. Namely, in the embodiments illustrated in FIGS. 1-4 the central axis of the side plates 3 is arranged at a distance from that of the first press roll 1, in a direction away from the nip 4. Although not illustrated, the central axis of the side plates 3 may also be offset form a line running through the central axis of the first press roll 1 and the second press roll 2, preferably towards the inlet side 4a of the nip 4.

Figure 3:
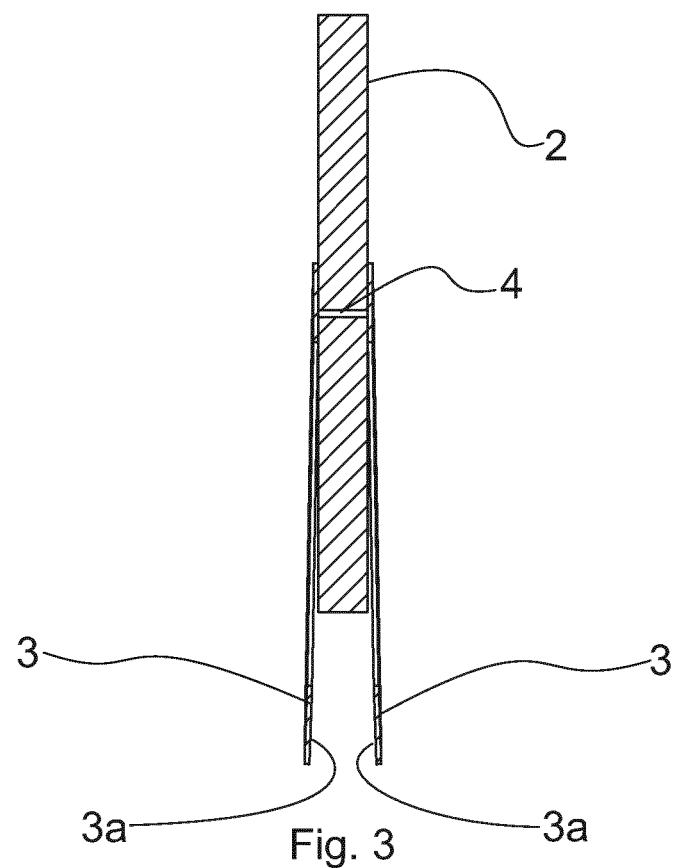

As seen more clearly in FIG. 3, the side surface 3a of the side plate 3 is inclined with respect to the axial end of the first and second press rolls 1, 2. More particularly, the side surface 3a of the side plate 3 is deflected towards the axial end of the press rolls 1, 2 at rotational position of the side plate 3 corresponding to the nip 4. Correspondingly, the side surface 3a of the side plate 3 diverges axially away from the axial end of the first press roll 1 and the second press roll 2 in a rotational direction of the side plate away from the nip 4. That is, the clearance between the side surface 3a and the axial end of the press rolls 1, 2 increases along the circumference of the side plate 3 away from the nip 4.

Figure 4:
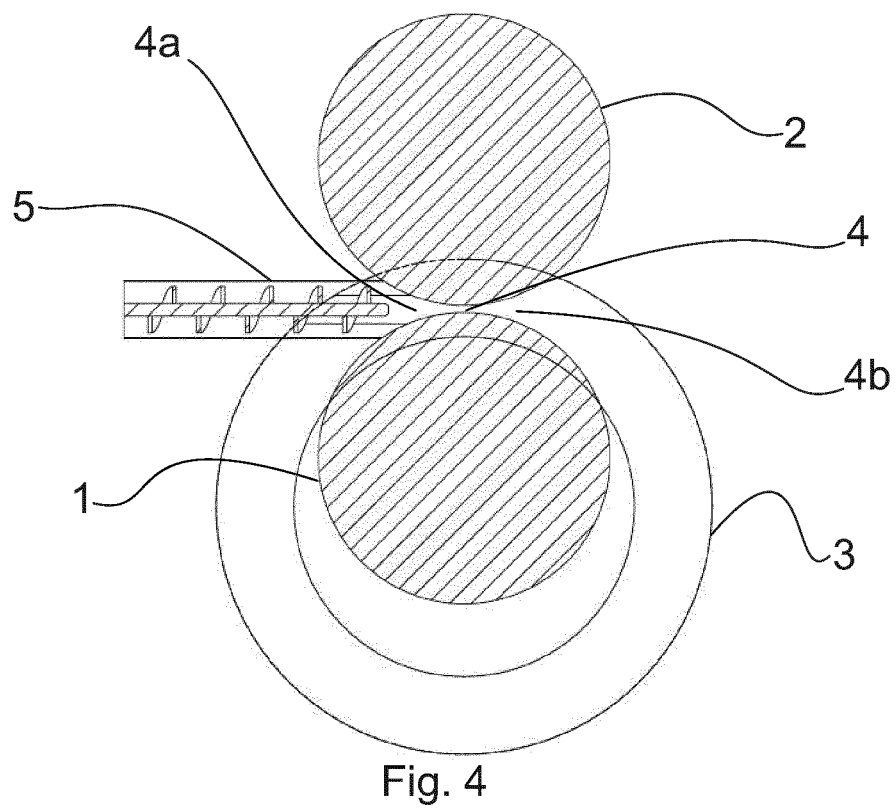
FIG. 4 schematically illustrates, in part, a roll press apparatus according to an embodiment of the present disclosure equipped with the press roll arrangement of FIGS. 1-3.

FIG. 4 depicts, in part, a roll press apparatus incorporating the press roll arrangement shown in FIGS. 1-3, as seen as partial cut-view from the side. Namely, FIG. 5 shows how the feed conveyor 5 is arranged to feed fibrous granular to the feed region at the inlet side 4a, of the nip.

Figure 5:
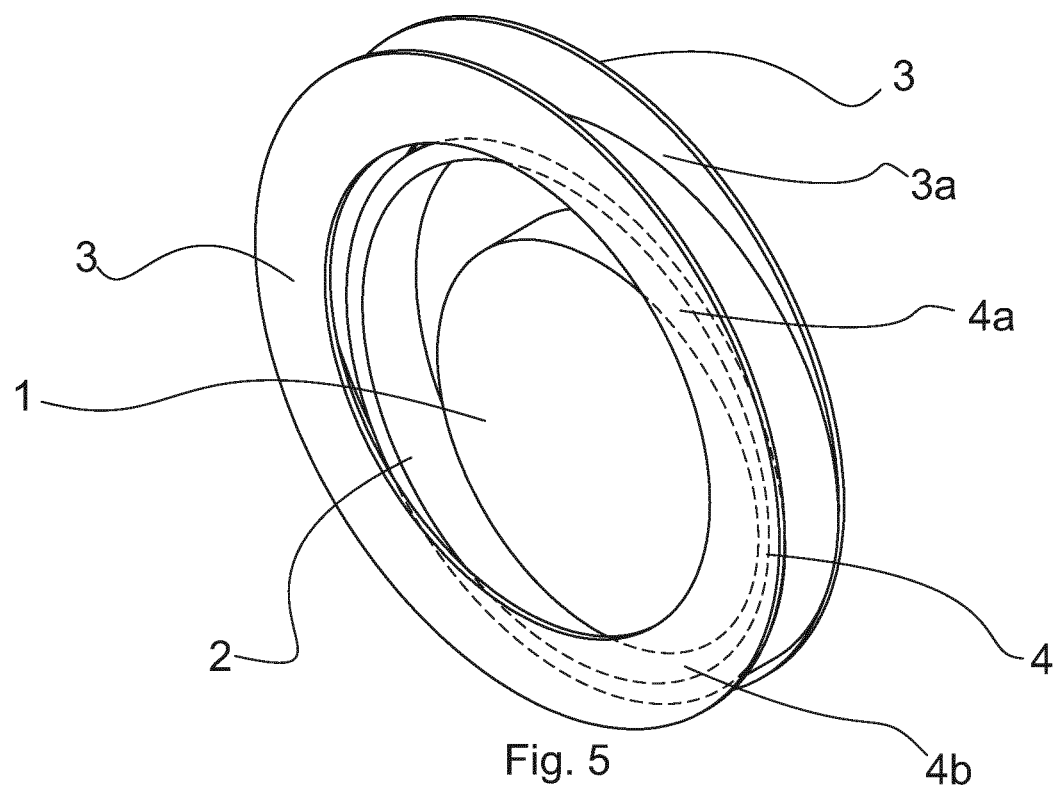
FIG. 5-FIG. 7 schematically illustrate different view of a press roll arrangement according to an embodiment of the present disclosure, FIG. 8 schematically illustrates, in part, a roll press apparatus according to an embodiment of the present disclosure equipped with the press roll arrangement of FIGS. 5-7, FIG. 9 schematically illustrates a roll press apparatus similar to the embodiment of FIG. 4 as seen in a perspective view, and FIG. 10 schematically illustrates a roll press apparatus similar to the embodiment of FIG. 8 as seen in a perspective view.

FIG. 5 depicts schematically a press roll arrangement according to another embodiment of the present disclosure, as seen from a perspective view. A first cylindrical press roll 1 and a second annular press roll are arranged to be rotatable about their respective central axis. Particularly, first press roll 1 is arranged within the second press roll, such that a nip 4 is formed between the outer circumferences of the first press roll 1 and the inner circumference of the second press roll 2. Annular side plates 3, rotatable about their respective common central axis, are arranged on both axial ends of the first press roll 1 and the second press roll 2, such that the side surface 3a of the side plate 3 axially delimits the nip 4.

When in use, fibrous granular feedstock is fed at the inlet side 4a of the nip, from where the feedstock is introduced to be compressed into the nip 4 by the rotation of the press rolls 1, 2. Dewatered feedstock is then advanced to the outlet side 4b of the nip 4 to be discharged. To prevent the feedstock from axially escaping the nip 4, the side plates 3 are supported against their respective axial ends of the press rolls 1,2, at least at position corresponding to the nip 4. Simultaneously, a clearance is provided between the side surfaces 3a of the side plate 3 and the respective axial ends of the press rolls 1, 2, at least at the feed region, thus providing a drainage route for liquid dewatered from the fibrous granular feedstock.

As seen more clearly from the side view of FIG. 2, the side plates 3 radially exceeds the outer circumference of the first press roll, such that the inlet side 4a of the nip 4 is also axially delimited by the side plates 3. This prevents a bed of fibrous granular feedstock being fed into the feed region from overflowing over the axial ends of the press rolls 1, 2.

Figure 6:
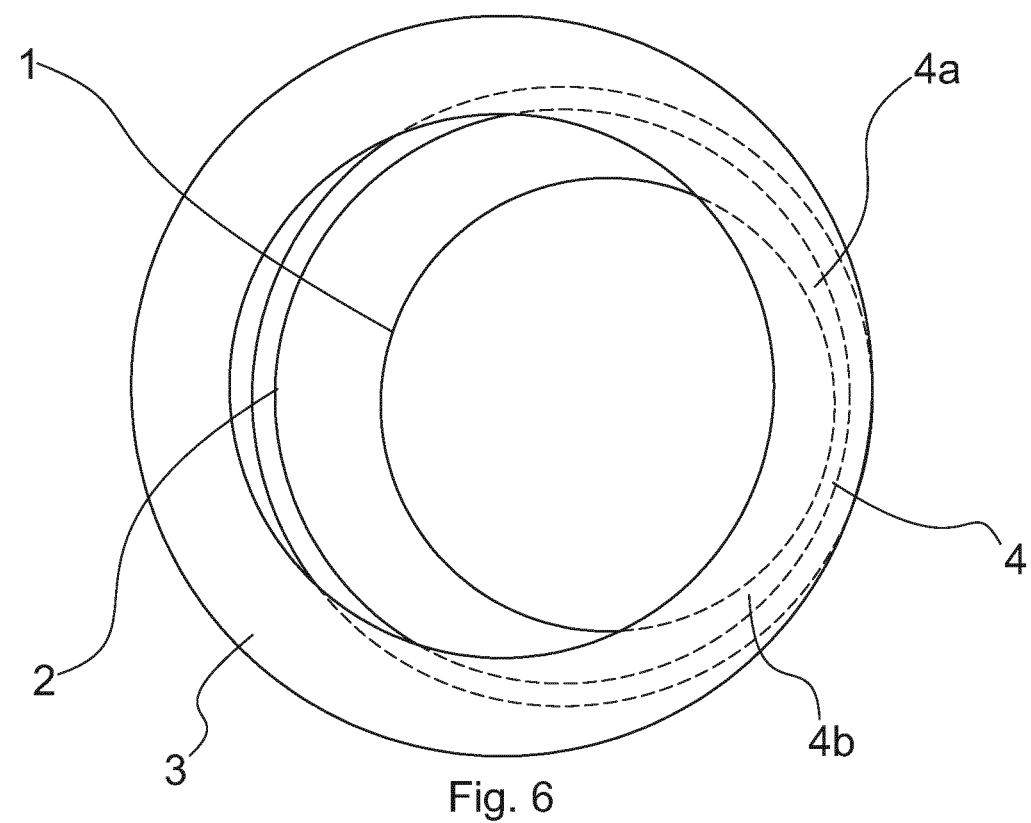

Also, more clearly seen in FIG. 2 the side plates 3 have a diameter substantially larger than that of the first press roll 1 and the second press roll 2. Moreover, the side plates 3 are arranged non-concentrically with the first and second press rolls 1, 2, such that the rotational direction of the side plates 3 diverges tangentially away from the rotational direction of the first press roll 1 at the outlet side 4b of the nip, outwardly from the outer circumferences of the first press roll 1. Namely, in the embodiments illustrated in FIGS. 5-7 the central axis of the side plates 3 is arranged at a distance from that of the first press roll 1, in a direction away from the nip 4. Although not illustrated, the central axis of the side plates 3 may also be offset form a line running through the central axis of the first press roll 1 and the second press roll 2, preferably towards the inlet side 4a of the nip 4.

Figure 7:
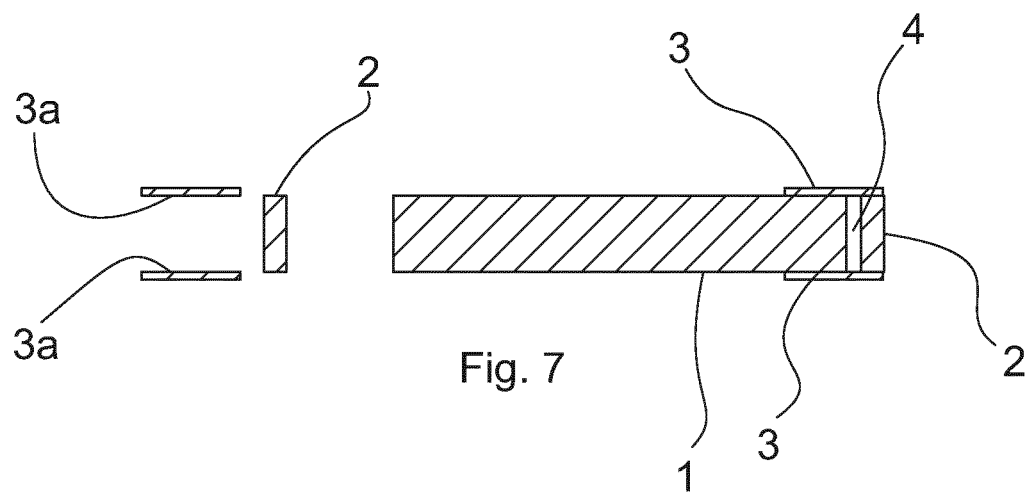

In addition, although not illustrated in in FIG. 7, the side surface 3a of the side plate 3 may be inclined with respect to the axial end of the first and second press rolls 1, 2 in a similar manner as discussed in connection with FIG. 4 above.

Figure 8:
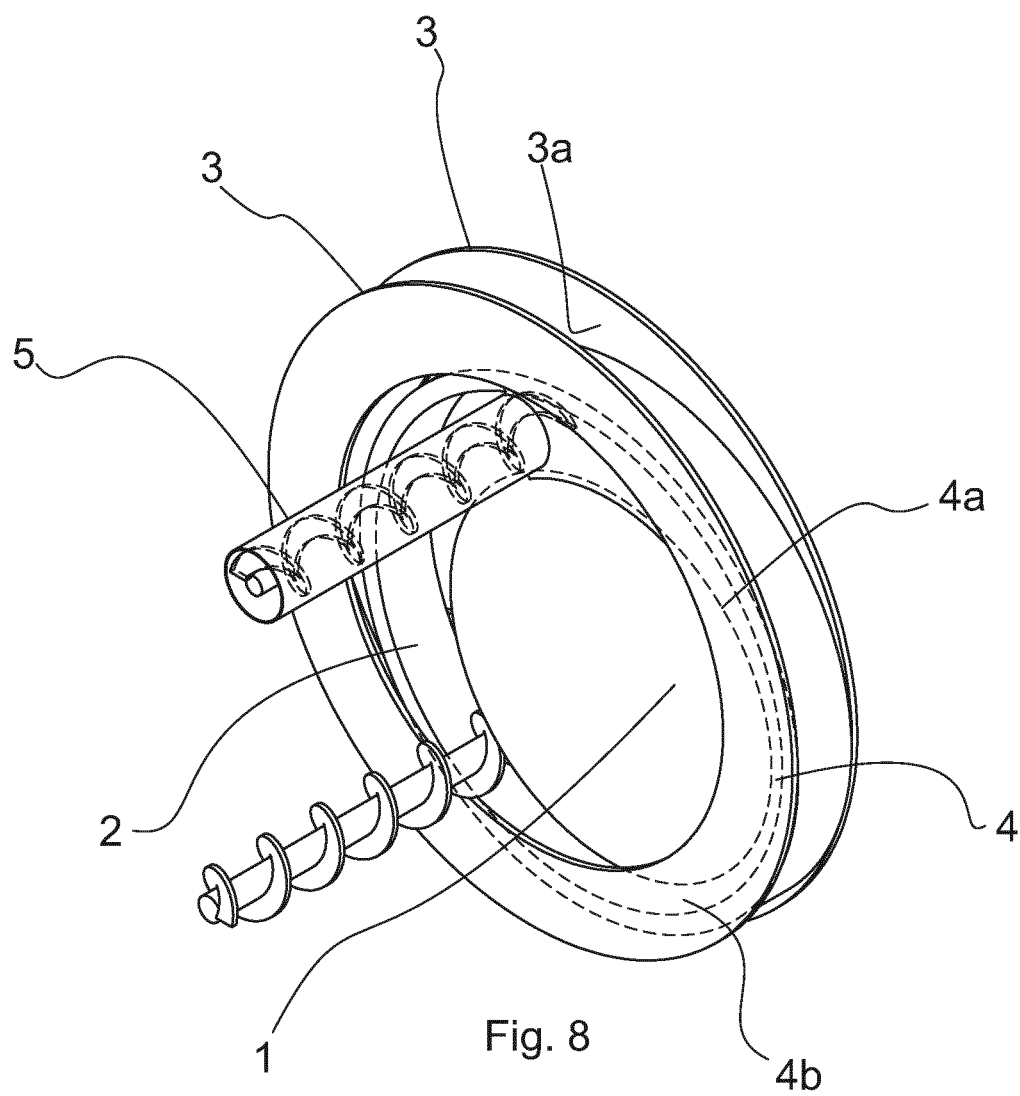

FIG. 8 depicts, in part, a roll press apparatus incorporating the press roll arrangement shown in FIGS. 4-7, as seen as partial cut-view from the side. Namely, FIG. 8 shows how the feed conveyor 5 is arranged to feed fibrous granular to the feed region at the inlet side 4a, of the nip. Correspondingly, a discharge conveyor is arranged at an outlet side 4b of the nip 4 for receiving dewatered granular feedstock from between the first and second press rolls.

Figure 9:
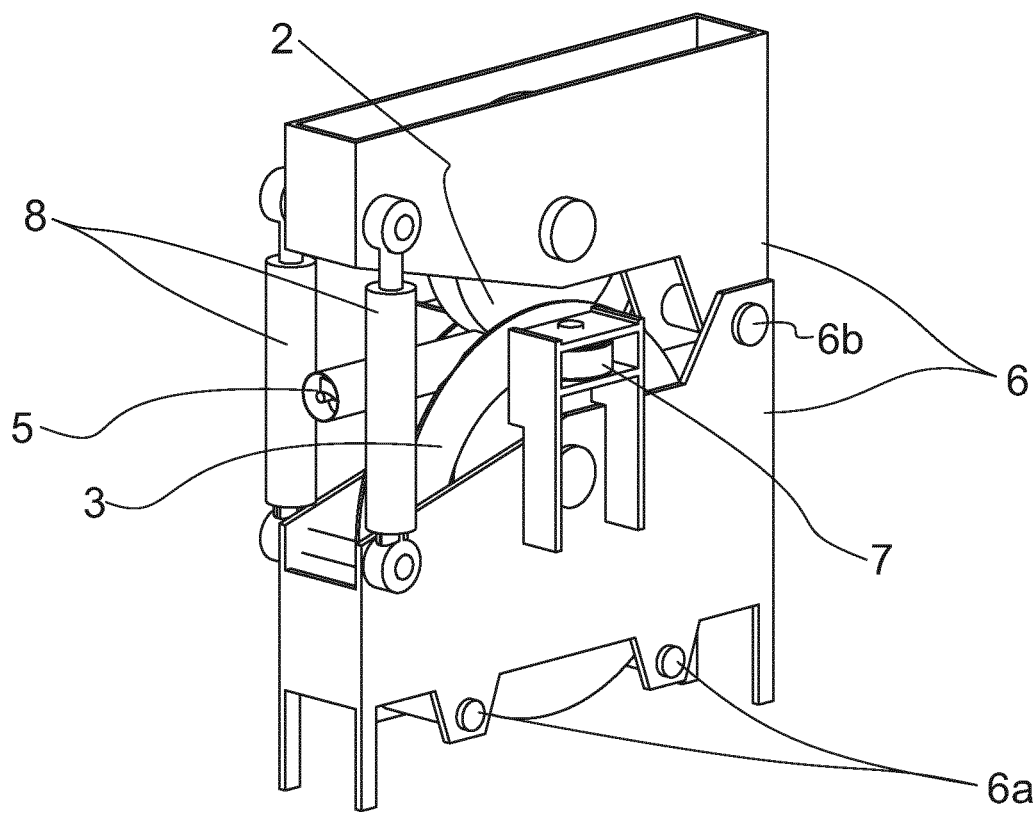

FIG. 9 schematically depicts a perspective view of press roll apparatus similar to the embodiment shown in FIG. 4. Particularly, an exemplary frame structure 6 supporting the first press roll 1, second press roll 2 and the side plates 3 is shown. The side plates 3 are supported at their outer circumference by side plate support rolls 6a. Moreover, axial biasing arrangement 7, provided as rollers supporting the side plate 3 against the axial ends of the first and second press roller 1, 2, are provided on the frame structure. Moreover, the axial biasing arrangement 7 may be biased towards the axial ends of the first and second press rolls 1,2 by, for example, a spring element, hydraulic or pneumatic elements, or simply by having an adjustable position in the axial direction.

In addition, radial biasing arrangement 8, provided as pneumatic or hydraulic cylinders, are arranged between opposing sections of the frame structure. Particularly, the opposing sections of the frame structure are configured to support the first and second press roll separately. That is, the first section of the frame structure 6 supports the first press roll 1, whereas the second section of the frame structure 6 supports the second press roll 2. Moreover, the opposing frame sections of the frame structure 6 are pivotable with respect to each other about a pivot point 6b, while the first and second press rolls are arranged between the radial biasing arrangement 8 and the pivot point 6b. This allow the radial biasing arrangement 8 to bias the first press roll 1 and the second press roll 2 towards each other for exerting a pressure on fibrous granular feedstock within the nip 4, when in use.

Figure 10:
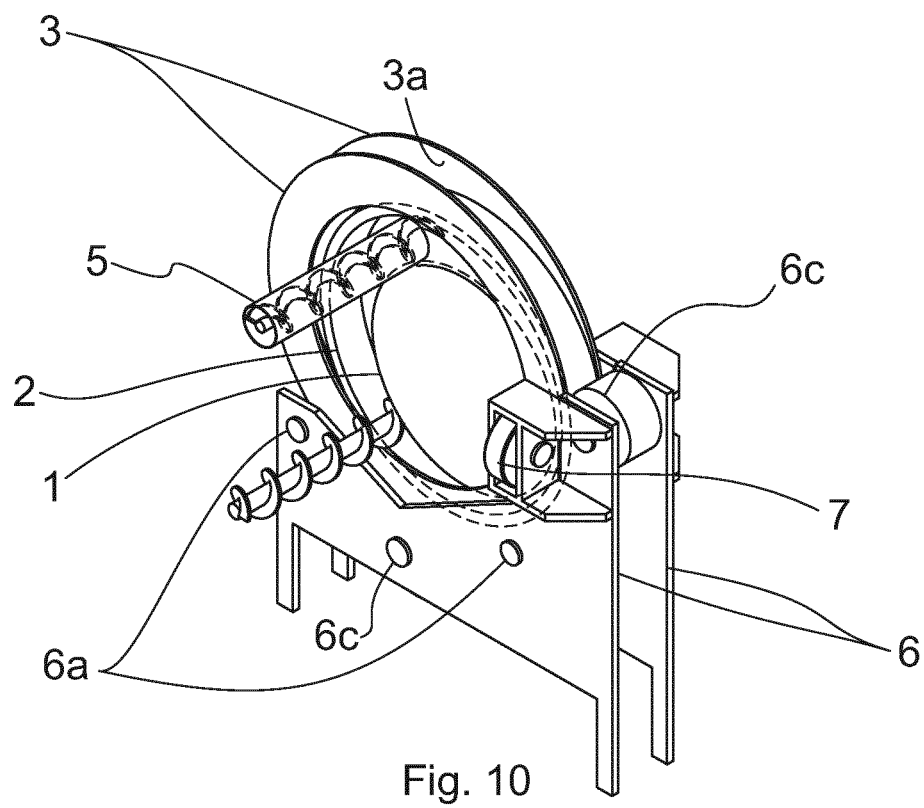

FIG. 10 schematically depicts a perspective view of press roll apparatus similar to the embodiment shown in FIG. 8. Particularly, a frame structure 6 supporting the second press roll 2 and the side plates 3 is shown. The first press roll 1 may be supported by a sub-frame (not illustrated) of the frame structure 6, for example. Naturally, any other suitable arrangement may be adapted for supporting the first press roll 1. The second press roll is supported at its outer circumference by second press roll support rolls 6c. The side plates 3 are supported at their outer circumference by side plate support rolls 6a. Moreover, axial biasing arrangement 7, provided as rollers supporting the side plate 3 against the axial ends of the first and second press roller 1, 2, are provided on the frame structure 6. Moreover, the axial biasing arrangement 7 may be biased towards the axial ends of the first and second press rolls 1,2 by, for example, a spring element, hydraulic or pneumatic elements, or simply by having an adjustable position in the axial direction.

In addition, a radial biasing arrangement may be provided in association with the first press roll 1. For example, the first press roll 1 may be supported such that it is movable and/or biased towards the inner circumference of the second press roll 2 at position corresponding to the nip 4. Such an radial biasing arrangement allows the first press roll 1 and the second press roll 2 to be biased towards each other for exerting a pressure on fibrous granular feedstock within the nip 4, when in use. Such biasing may be achieved, for example, by providing a spring element or hydraulic/pneumatic elements in connection with the first press roll 1, or simply by having an adjustable position for the first press roll 1 in the radial direction towards the nip 4.

The invention claimed is:

1. A roll press arrangement for dewatering fibrous granular feedstock in a roll press apparatus, comprising:
   a first cylindrical press roll having a first central axis, said first press roll being arranged to be rotatable about said first central axis, and
   a second cylindrical press roll having a second central axis parallel with the first central axis, said second press roll being arranged to be rotatable about said second central axis,
   wherein the first press roll and the second press roll are further arranged such that a nip is formed between the first press roll and the second press roll so as to apply a compression force on fibrous granular feedstock for dewatering thereof, when the roll press arrangement is in use, and
   wherein a feed region is defined between the first press roll and the second press roll at an inlet side of the nip, the first press roll and the second press roll being rotatable towards the nip on the inlet side thereof for introducing said fibrous granular feedstock from said feed region into the nip,
   the roll press arrangement further comprises a side plate having a third central axis, said side plate being further arranged to be rotatable about said third central axis towards the nip on the inlet side thereof,
   wherein the side plate is arranged at an axial end of the first press roll and the second press roll such that a side surface of the side plate axially delimits at least the nip and the feed region, wherein the side plate is further supported against or adjacent to the axial ends of the first press roll and the second press roll at least at a position corresponding to the nip when the roll press arrangement is not in use so as to prevent the fibrous granular feedstock from escaping the nip in an axial direction, when the roll press arrangement is in use, wherein a clearance of 0.1 mm-4 mm, when the roll press arrangement is in use, is arranged between the side surface of the side plate and the axial end of the first press roll and the second press roll at least at the feed region so as to provide a drainage route for liquid dewatered from the fibrous granular feedstock, wherein the side plate has a diameter larger than that of the first press roll, and wherein the side plate is arranged to radially exceed an outer circumference of the first press roll so as to axially delimit a bed of fibrous granular feedstock in the feed region, when the roll press arrangement is in use.

2. The press roll arrangement according to claim 1, further comprising a radial biasing arrangement so as to bias the first press roll and the second press roll towards each other for exerting a pressure on fibrous granular feedstock within the nip, when the roll press arrangement is in use.

3. The press roll arrangement according to claim 1, wherein the side plate is arranged non-concentric with at least the first press roll, such that a rotational direction of the side plate diverges tangentially away from the rotational direction of the first press roll at an outlet side of the nip, outwardly from the outer circumference of the first press roll.

4. The press roll arrangement according to claim 3, wherein the side plate is arranged non-concentric with the second press roll, such that the rotational direction of the side plate diverges tangentially away from the rotational direction of the second press roll at an outlet side of the nip, outwardly from the outer circumference of the second press roll.

5. The press roll arrangement according to claim 1, wherein the side surface of the side plate is arranged to axially diverge away from the axial ends of the first press roll and the second press roll in a rotational direction of the side plate away from the nip when the roll press arrangement is in use.

6. The press roll arrangement according to claim 1, further comprising an axial biasing arrangement arranged to axially deflect the side surface of the side plate towards the axial ends of the first press roll and the second press roll at least at a rotational position corresponding to the nip when the roll press arrangement is in use.

7. The roll press arrangement according to claim 1, wherein the first press roll and the second press roll are positioned adjacent to each other, such that the nip is formed between the respective outer circumferences of the first press roll and the second press roll.

8. The roll press arrangement according to claim 1, wherein the second press roll has an annular cross-sectional profile, and wherein the first press roll is positioned within the second press roll such that the nip is formed between the outer circumference of the first press roll and the inner circumference of the second press roll.

9. A roll press apparatus comprising the press roll arrangement according to claim 1, the roll press apparatus further comprising:

a first rotation drive arrangement for rotating either, or both, of the first press roll and the second press roll, and a feed conveyor for feeding fibrous granular feedstock into the feed region.

10. The roll press apparatus according to claim 9, wherein the side plate is arranged to be rotationally driven.

11. A method of dewatering fibrous granular feedstock using a roll press arrangement in a roll press apparatus comprising a first cylindrical press roll having a first central axis, said first press roll being arranged to be rotatable about said first central axis, and a second cylindrical press roll having a second central axis parallel with the first central axis, said second press roll being arranged to be rotatable about said second central axis, wherein the first press roll and the second press roll are further arranged such that a nip is formed between the first press roll and the second press roll, wherein a feed region is defined between the first press roll and the second press roll at an inlet side of the nip, the first press roll and the second press roll being rotatable towards the nip on the inlet side, wherein the roll press arrangement further comprises a side plate having a third central axis, said side plate being further arranged to be rotatable about said third central axis towards the nip on the inlet side thereof, wherein the side plate is arranged at an axial end of the first press roll and the second press roll such that a side surface of the side plate axially delimits at least the nip and the feed region, wherein the side plate is further supported against or adjacent to the axial ends of the first press roll and the second press roll at least at a position corresponding to the nip when the roll press arrangement is not in use, wherein the side plate has a diameter larger than that of the first press roll, and wherein the side plate is arranged to radially exceed an outer circumference of the first press roll so as to axially delimit a bed of fibrous granular feedstock in the feed region, when the roll press arrangement is in use, the method comprising:

feeding said fibrous granular feedstock to the feed region defined between the first press roll and the second press roll at the inlet side of the nip; and rotating either, or both, of the first press roll and the second press roll, so as to introduce said fibrous granular feedstock from the feed region into the nip between the first press roll and the second press roll.

12. The method according to claim 11, further comprising:

wherein, when the roll press arrangement is in use, the side surface of the side plate and the axial ends of the first press roll and the second press roll at least at a position corresponding to the nip to prevent the fibrous granular feedstock from escaping the nip in an axial direction, arranging a clearance of 0.1 mm-4 mm between the side surface of the side plate and the axial ends of the first press roll and the second press roll at least at the feed region when the roll press arrangement is in use so as to provide a drainage route for liquid dewatered from the fibrous granular feedstock, and receiving said dewatered liquid from the drainage route.

13. The method according to claim 12, further comprising rotating the side plate about the third central axis towards the nip at the inlet side thereof.

* * * * *